Feb. 6, 1962 C. L. HANSEN 3,019,546
LINE ATTACHING DEVICE
Filed March 18, 1958

INVENTOR,
CHRISTIE L. HANSEN
BY
ATTORNEY

United States Patent Office 3,019,546
Patented Feb. 6, 1962

3,019,546
LINE ATTACHING DEVICE
Christie L. Hansen, P.O. Box 12, Port Sulphur, La.
Filed Mar. 18, 1958, Ser. No. 722,272
19 Claims. (Cl. 43—44.91)

The present invention relates to a device to be removably secured to a line and more particularly to a float or bob to be secured to a fishing line.

According to the present invention, there is provided a device comprising two separable sections having facing inner walls, one of said walls having a channel therein for receiving the line and means on the other of said inner walls cooperating with the bottom of said channel to frictionally engage the line therebetween to prevent relative movement between the line and the device. In the preferred embodiment the two sections are buoyant and are hingedly secured to each other to permit the sections to be separated or opened to position the line in the channel.

One of the objects of the present invention is to provide a device to be removably secured to a line without any need for cutting, crimping, twisting or bending the line.

It is a further object of the present invention to provide a device which can easily be secured to or removed from a line which contains no metal parts thereby eliminating the problem of rusting or other corrosion.

It is a further object of the present invention to provide a device to be secured to a line which remains firmly positioned on the line wherever it is placed.

These and further objects of the invention will be more readily apparent from the following detailed description.

Figure 1:
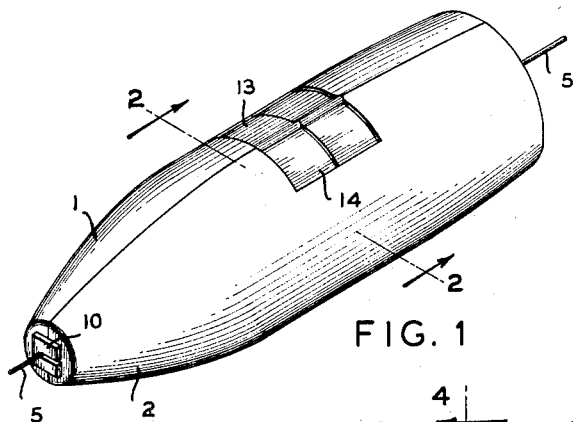
FIG. 1 is a perspective view of one modification of the present invention, particularly as applied to a fishing float.

Referring to FIGS. 1-4, in one embodiment of the present invention there is provided a float comprising two separable sections 1 and 2 having facing or abutting inner walls 3 and 4. In inner wall 3 there is a longitudinal channel 6 of U-shaped cross section. This channel comprises a groove 7 in which is positioned or mounted a U-shaped insert 8. Preferably near each end of the insert is an upstanding wall 10 integral with the insert. Each wall has therethrough a slit 11.

In the inner wall 4 there is provided means cooperating with the channel 6 in wall 3 to frictionally engage therebetween a line 5 when the two sections 1 and 2 are in the closed position. The means in wall 4 comprises a projecting member or rib 15 mounted or secured in the groove 16 in the wall 4. Preferably this projecting member or rib 15 has a T-shaped cross section with the stem 17 of the T projecting above the face of wall 4 to be received between the arms of the U-shaped insert 8 of channel 6. When the two sections are opposed in the closed position, the bottom of the stem and the bottom of the channel cooperate to frictionally engage the line therebetween.

In the preferred construction, channel 6 and projecting rib 15 are made of a flexible resilient material such as rubber or any other elastomer. "Rubber" or "elastomer" as used herein include any natural or synthetic rubber such as neoprene, any of the rubbery polymers of butadiene such as butadiene-styrene or butadiene-acrylonitrile, or any of the rubbery vinyl polymers such as polyvinyl chloride or any other synthetic flexible resilient rubber-like material.

Each of the sections 1 and 2, when the device is to be used as a float or bob, may be made of any buoyant material such as wood, cork or any other natural buoyant material or any synthetic buoyant material. In the preferred construction the sections 1 and 2 are made of a synthetic buoyant material such as cellular polystyrene.

In the construction shown in FIGS. 1-4, the two sections are separably secured to each other by means of a hinge 12 and a latch comprising members 13 and 14. The hinge 12 may be of extremely simple construction and may merely comprise a strip of plastic material, the ends of which are secured to the sections 1 and 2.

In the preferred construction, the sections 1 and 2 are recessed near the hinge and the latch in order that there be no projections from the surface of the float upon which a line or debris can become entangled. Obviously, any other hinge means or latch may be utilized. If it is desired to use a metal hinge as the hinge 12, a spring hinge can be used which would eliminate the necessity for any type of latch.

When utilizing a hinge construction, it is preferable to provide that the groove 16 be outwardly beveled as at 18 and to similarly provide an outward bevel 9 in the arms or sides of the U-shaped insert 8. These bevels provide clearance for the insertion of the projecting rib 15 into the channel 6 when the float is closed.

Figure 3:
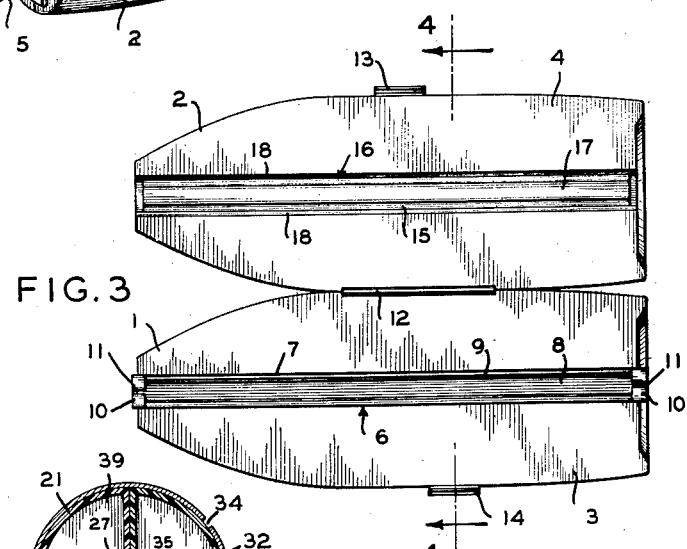
FIG. 3 is a plan view of the open float of FIG. 1.

It is preferred that the line engaged by the float be maintained out of contact at all times from the body of the float to avoid any entanglement of the line or unnecessary abrasion. To accomplish this purpose, the walls 10 having slit 11 therein are provided. These walls and the slit cooperate in the manner shown in FIG. 1 to keep the ends of the line secured within the channel and prevent the line from working its way around the channel to contact the float. In this preferred construction, the upstanding walls 10 extend slightly beyond the ends of the sections 1 and 2 as shown in FIGS. 1 and 3.

It is evident from the drawings that the stem 17 extends beyond the face of wall 4 and the arms of the U-shaped channel similarly extend beyond the face of the wall 3 while the end walls 10 extend beyond the ends of the arms of the channel.

Figures 5, 6, 7:
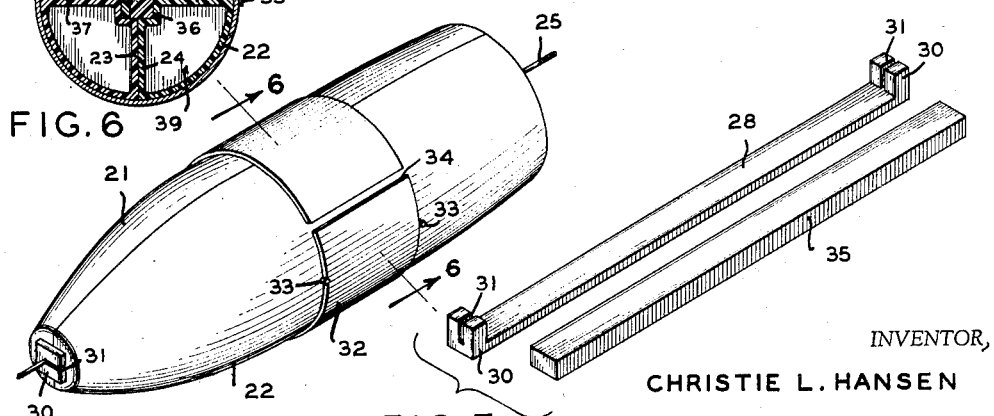
FIG. 5 is a perspective view of another modification of the present invention wherein a slip ring is used to secure the two sections to each other.
FIG. 6 is a cross section along the line 6—6 of FIG. 5.
FIG. 7 is a perspective view of the line securing means shown in cross section in FIG. 6.

Instead of using the hinge and/or latch means to removably secure the two sections to each other, there may be provided a slip ring 32 as shown in FIG. 5. This slip ring may be a resilient or spring-like member which is slipped over the two sections to hold them together by its resilient action. Preferably, however, the ring 32 may be made of relatively rigid material such as metal or plastic having a slit 34 therethrough. One of the sections 21 and 22 may have mounted in the surface thereof a pair of pins 33.

In this construction, when the two sections 21 and 22 are assembled with the line 25 therethrough, the ring 32 is slipped over the device with the slit 34 in line with the pins 33 until the ring is positioned between the pins 33. Then the ring is rotated to remove the slit 34 out of alignment with the pins 33.

In the embodiment shown in FIG. 5, the two sections 21 and 22 are made of hollow plastic material having inner faces 23 and 24 which are supported by reinforcing ribs 37. In each of the faces 23 and 24 there is provided a groove 27 and 36 respectively which correspond to the grooves 7 and 16 of FIGS. 1-4.

Mounted in groove 27 is an insert 28 (see FIG. 7) which together with the groove defines a channel for receiving the line. This insert 28 has a pair of end walls 30 with each end wall having a slot 31 therein. The end walls 30 function in the same manner as the walls 10 in the modification of FIGS. 1–4.

In groove 36 there is mounted an insert 35 which is a projecting member or rib functioning in the same manner as member 15 described above.

As can be more clearly seen in FIG. 6, the periphery or shell of each section 21 and 22 together with the respective inner walls 23 and 24 and reinforcing ribs 37 define hollow chambers 39 which render the device buoyant. If so desired, these hollow chambers 39 may be filled with buoyant material such as particles of cork or cellular polystyrene.

It is evident that the slip ring construction of FIG. 5 may be used in lieu of the hinge and latch construction of FIGS. 1–4 with solid buoyant sections and conversely, the hinge and latch means of FIGS. 1–4 could be used with the hollow buoyant sections of FIGS. 5 and 6.

Figure 2:
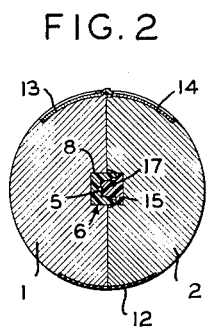
FIG. 2 is a cross section of the device of FIG. 1 along the line 2—2 of FIG. 1.
Figure 4:
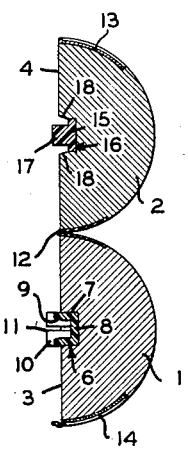
FIG. 4 is a cross section of the open float of FIG. 3 along the line 4—4 of FIG. 3.

In addition, the inserts of FIG. 7 can be used with the modification of FIG. 4 or the inserts shown in FIGS. 2, 3 and 4 may be used with the hollow sections or slip ring construction of FIGS. 5 and 6. In other words, any combination of inserts, hollow or solid sections, or means securing the sections together may be used if so desired.

In the illustrated embodiments, the device has been shown as an elongated float. Obviously, the shape merely represents a matter of choice and the device may be spherical, ovoidal or any other desired shape.

Similarly, although this device is particularly directed to use as a float, it may be used for any other as any other device to be attached to a line, namely, a plug or a sinker provided, of course, it is made of appropriate materials.

The inserts 8, 15, 28 and 35 may be integral with their respective walls or they may be mounted therein in any desired manner and preferably by an adhesive. At least one of the line engaging surfaces of said inserts is resilient. Preferably, all the line engaging surfaces are resilient in order to avoid any damage or weakening of the line as well as to hold the line securely, without sliding, between the opposed sections of the float.

It is evident that in the device of the present invention the fishing line 5 is not bent or twisted but is always maintained in a straight line and is fully supported in its entirety between the sections of the device.

"Separable" as used herein refers to the ability to completely remove one section of the float from the other one as shown in the embodiment of FIG. 5 or the ability to pivot one section away from the other section as shown in FIG. 3 to completely separate from each other the inserts in each section. The hinge means 12 and the split locking ring 32 both serve to separably secure the sections in face to face, or abutting, relation to each other.

Thus, it is seen that according to the present invention there is provided a device to be secured to a line, preferably a float, which may be made of cellular polystyrene or other plastic material which requires no metal parts which would ultimately corrode or rust. The line is easily inserted in the float by separating the two sections, laying the line in the channel and closing the float. The line does not have to be kinked, curled or twisted in any manner in order to provide a secure positioning of the float on the line. Similarly, when the float is to be removed from the line, it is merely necessary to open up the float and remove the line therefrom.

Damage to the line is minimized, in the preferred construction, because the only surfaces which can possibly touch the line are the inserts which are preferably of rubber. The hardness of the rubber may be varied as desired. Rubber of a hardness of 25–40 durometer rating has been found to provide sufficient resiliency to prevent sliding of the line with a minimum of pressure and minimum damage to the line.

I claim:

1. A device to be removably secured to a line comprising a pair of separable sections having facing inner walls, the first of said inner walls having a channel therein for receiving a line parallel to said channel, said channel including a resilient insert, said insert having an upstanding transverse wall near each end of said channel, each upstanding wall having a slit therein for receiving said line, said slit being narrower than said channel, means on the second of said inner walls, said means being received within said channel and cooperating with said channel for frictionally engaging said line therebetween to prevent relative movement between said line and said device, and means to separably secure the sections in face to face relation to each other, said sections being separable from each other by relative movement transverse to the planes of said inner walls.

2. A device as recited in claim 1 wherein said insert and said frictionally engaging means comprise a resilient elastomer.

3. A device as recited in claim 1 wherein said means on said second inner wall comprises a resilient rib.

4. A device as recited in claim 1 wherein said insert has a generally U-shaped cross section, the arms of the U defining the sides of said channel.

5. A device to be removably secured to a line comprising a pair of separable sections having facing inner walls, the first of said inner walls having a channel therein for receiving a line parallel to said channel, said channel being defined by a resilient insert having a generally U-shaped cross-section, the arms of the U defining the sides of said channel, said insert having an upstanding wall near each end of said channel, each upstanding wall having a slit therein for receiving said line, means on the second of said inner walls cooperating with said channel for frictionally engaging said line therebetween to prevent relative movement between said line and said device, said means on said second inner wall comprising a resilient insert mounted in a groove in said second inner wall, said insert having a T-shape cross-section, the cross member of said T being mounted on the bottom of said groove, the stem of the T defining a rib extending between the sides of said channel, and means to separably secure the sections in face to face relation to each other.

6. A device as recited in claim 4 wherein said insert in said first inner wall extends beyond the ends of said inner wall.

7. A float to be removably secured to a line comprising a pair of separable buoyant sections having facing inner walls, the first of said inner walls having a groove therein extending the length of said wall, a U-shaped resilient insert mounted in said groove, said insert defining a channel for receiving a line parallel thereto, an upstanding wall near each end of said insert, each upstanding wall having a slit therein for receiving said line, the second of said inner walls having a groove therein parallel and opposed to said channel, a resilient T-shaped member mounted in said last-named groove, the stem of the T extending into said channel, the bottom of said channel and the bottom of said stem together frictionally engaging a line therebetween to prevent relative movement between said line and said float, and means to separably secure the sections in face-to-face relation to each other.

8. A float as recited in claim 7 wherein said securing means includes hinge means.

9. A float as recited in claim 8 wherein the inner faces of the sides of said U-shaped channel are outwardly beveled.

10. A float as recited in claim 9 wherein the inner faces of the groove in said second inner wall are outwardly beveled.

11. A float as recited in claim 7 wherein said buoyant sections comprise cellular polystyrene.

12. A float as recited in claim 7 wherein said buoyant sections are hollow.

13. A float as recited in claim 7 wherein said securing means includes a split locking ring slidably mounted around the periphery of said sections.

14. A device to be removably secured to a line comprising a pair of separable sections having facing inner walls, the first of said inner walls having a channel therein for receiving a line parallel to said channel, an upstanding transverse wall near each end of said channel, each upstanding transverse wall having a slit therein for receiving said line, said slit being narrower than said channel, means on the second of said inner walls cooperating with said channel for frictionally engaging said line therebetween to prevent relative movement between said line and said device, and means to separably secure the sections in face to face relation to each other, said securing means including hinge means interconnecting said sections near their adjacent edges to provide for separation of said sections by movement transverse to the planes of said inner walls.

15. A float to be removably secured to a line comprising a pair of separable buoyant sections having facing inner walls, the first of said inner walls having a channel therein for receiving a line parallel to said channel, means on the second of said inner walls, said means being complementary in shape to said channel and being received within and substantially filling said channel and cooperating with said channel for frictionally engaging said line therebetween to prevent relative movement between said line and said float, and means to separably secure the sections in face to face relationship to each other, said sections being separable from each other by relative movement transverse to the planes of said inner walls.

16. A float as recited in claim 15, wherein the line is engaged between the surfaces of said channel and means on said second inner wall, at least one of said surfaces being resilient for frictionally engaging said line.

17. A float as recited in claim 16, wherein the line engaging surfaces of said channel and said means on said second inner wall both comprise a resilient elastomer.

18. A device to be removably secured to a line comprising a pair of separable sections having facing inner walls, the first of said inner walls having a channel therein for receiving a line parallel to said channel, means on the second of said inner walls, said means projecting into and being received within said channel and cooperating with said channel for frictionally engaging said line therebetween to prevent relative movement between said line and said device, an upstanding transverse wall near each end of one of said channel and said means, each upstanding wall having a slit therein for receiving said line, said slit being narrower than said channel, and means to separably secure the sections in face to face relationship to each other, said sections being separable from each other by relative movement transverse to the planes of said inner walls.

19. A device as recited in claim 18, wherein said sections are buoyant.

References Cited in the file of this patent

UNITED STATES PATENTS

| | | |
|---|---|---|
| 418,995 | Tufts | Jan. 7, 1890 |
| 419,574 | Vasseur | Jan. 14, 1890 |
| 915,406 | Bartley | Mar. 16, 1909 |
| 1,176,631 | Wells | Mar. 21, 1916 |
| 1,240,043 | Gregory et al. | Sept. 11, 1917 |
| 2,406,252 | Potter | Aug. 20, 1946 |

FOREIGN PATENTS

| | | |
|---|---|---|
| 80,718 | Germany | Apr. 18, 1895 |